United States Patent [19]

Haering et al.

[11] Patent Number: 4,760,129
[45] Date of Patent: Jul. 26, 1988

[54] PROCESS FOR PREPARING HIGHLY VISCOUS POLYHEXAMETHYLENEADIPAMIDE

[75] Inventors: Erwin Haering; Heinz Herrmann; Wolfgang Klein, all of Stuttgart; Herbert Ocker, Leonberg; Hans Werner, Stuttgart, all of Fed. Rep. of Germany; Elvina. S. Bokarjowa, Moscow, U.S.S.R.; Sijar N. Nurmuchamedow, Moscow, U.S.S.R.; Harry I. Feidel, Moscow, U.S.S.R.; Larisa A. Nosowa, Moscow, U.S.S.R.; Alla A. Dukor, Moscow, U.S.S.R.

[73] Assignees: Werner & Pfleiderer, Stuttgart, Fed. Rep. of Germany; Nautschno-Proisvodstvennoje Objedinenije "Plastmassy", Moscow, U.S.S.R.

[21] Appl. No.: 891,025

[22] Filed: Jul. 31, 1986

[30] Foreign Application Priority Data

Jul. 31, 1985 [SU] U.S.S.R. ............... 3924501
Feb. 19, 1986 [DE] Fed. Rep. of Germany ....... 3605202

[51] Int. Cl.$^4$ .................. C08G 69/46; C08G 69/48
[52] U.S. Cl. .................... 528/481; 525/419; 525/420; 528/335; 528/483; 528/499
[58] Field of Search ............. 525/420, 419; 528/335, 528/481, 483, 499

[56] References Cited

U.S. PATENT DOCUMENTS

| | | | |
|---|---|---|---|
| 3,040,005 | 6/1962 | Bernhardt et al. | 260/78 |
| 3,155,637 | 11/1964 | Reichold et al. | 525/420 |
| 3,496,149 | 2/1970 | Tsunawaki et al. | 525/420 |
| 3,509,107 | 4/1970 | Brignac | 260/78 |
| 3,562,206 | 2/1971 | Silverman et al. | 525/420 |
| 3,763,113 | 10/1973 | Burrows et al. | 525/420 |
| 3,821,171 | 6/1974 | Beaton | 260/78 SC |
| 3,821,174 | 6/1974 | Buning | 260/90.71 |
| 3,840,500 | 10/1974 | Ryffel et al. | 525/420 |

Primary Examiner—Harold D. Anderson
Attorney, Agent, or Firm—Foley & Lardner, Schwartz, Jeffery, Schwaab, Mack, Blumenthal & Evans

[57] ABSTRACT

A process for preparing highly viscous polyhexamethyleneadipamide by postpolycondensing the melt of a polymer having a relative viscosity of 2.5–2.7 (measured in a 1% strength solution in 96% strength sulfuric acid) in a twin-screw extruder having degassing zones and closely meshing screws which turn in the same direction. The polymer melt is polycondensed in the extruder by treatment in a plurality of serially arranged zones of alternatingly elevated and reduced pressure, wherein in the zones of elevated pressure, steam superheated to the temperature of the melt is supplied to the melt in an amount of 0.05–0.7 kg/kg of polymer, whereas in the zones of reduced pressure, the input vapor phase and water of condensation are drawn off. The temperature of the melt is raised at a uniform rate over the length of the extruder from 260°–280° C. in the first zone to 280°–310° C. in the last zone.

11 Claims, 1 Drawing Sheet

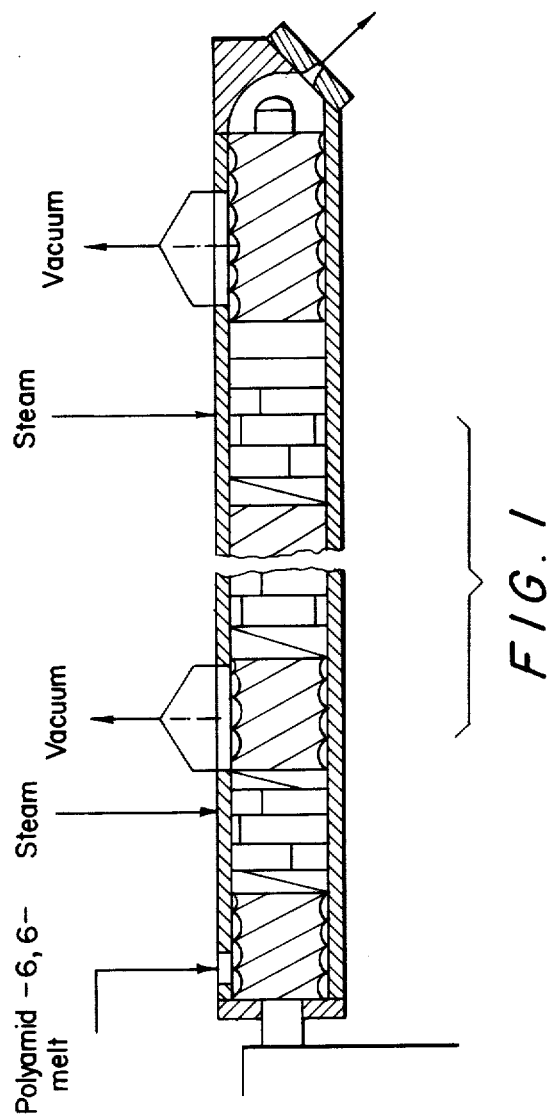

PROCESS FOR PREPARING HIGHLY VISCOUS POLYHEXAMETHYLENEADIPAMIDE

BACKGROUND OF THE INVENTION

The present invention relates to a process for preparing highly viscous polyamides, in particular polyhexamethyleneadipamide (nylon-6,6), which are suitable for further processing in extruders to form pipes, profiles, films and the like. The relative viscosity ($\eta$ rel) of polyamides, measured in a 1% strength solution in 96% strength sulfuric acid at 25° C., which are intended for processing by extrusion is 3.5–7.5. This corresponds to an average molecular weight ($M_n$) of 23,000–45,000.

Known processes for preparing such polyamides by means of the postpolycondensation of granulated low-viscosity polymers in the absence of a solvent at a temperature which is lower than the melt temperature are described for example in French Pat. No. 2,143,944 which corresponds to U.S. Pat. No. 3,821,174 and also in West German Pat. No. 1,210,183 and East German Pat. No. 91,566.

Normally the postpolycondensation of polyamides in the absence of a solvent is carried out in a batchwise or continuous dryer under inert gas or in vacuo. This method makes it possible to prepare polyamides having a sufficiently high viscosity ($\eta$ rel up to 5.0 or more), which are suitable for further processing in the extruder. However, the postpolycondensation in the absence of a solvent has certain disadvantages.

First, owing to the low temperature, the duration of the process is too long, being in general 24 hours or more. Secondly, large amounts of protective gas which is heated to temperatures of more than 200° C. are consumed. In addition, the polymer produced by postpolycondensation in the absence of a solvent has a wide molecular weight distribution on account of the nonuniform rate of removal of the water of condensation across the thickness of the granules. This in turn impairs the processing properties.

Another way of preparing highly viscous polyamides is the continuous postcondensation in the melt using various screw apparatuses.

U.S. Pat. No. 3,509,107 discloses a process for increasing the molecular weight of polyamides, for example, polyhexamethyleneadipamide. In this process, a low viscosity melt of presynthesized polyhexamethyleneadipamide (relative viscosity of an 11% strength solution in 90% strength formic acid of 17, corresponding to a molecular weight $M_n$ of 4000) is supplied to a horizontal single-screw extruder, where it is treated at 200°–295° C. for 0.1–1.5 hours countercurrently in an amount of 0.275–25.7 l/kg of polymer, preferably 1.28 kg–6.42 l/kg, of supplied nitrogen at 285° C. The maximum relative viscosity values thus obtained are 75–77 K units, which corresponds to an average molecular weight $M_n$ of 19,000 or a relative viscosity of 3, measured in sulfuric acid.

West German Pat. No. 1,720,349 also discloses a process for increasing the molecular weight of polyhexamethyleneadipamide, by supplying the presynthesized low viscosity polyhexamethyleneadipamide having a K value of 30–60, corresponding to a molecular weight of 4000–15,000, together with 1–10% by weight of steam to a twin-screw reactor having closely meshing self-cleaning screws and a least one degassing (vent) opening. The polymer is treated at 270°–285° C. and a pressure of 50 torr to 2300 torr for 5–45 min. with an energy supply through the screws of 0.03 to 0.2 kWh/kg of polymer. The maximum molecular weight which is obtainable using this process corresponds to a K value of 69–72, namely $M_n = 18,000$.

The disadvantage of the abovementioned known processes for increasing the molecular weight of nylon-6,6 is that polymers having a molecular weight of more than 20,000 cannot be prepared. However, the manufacture of pipes, profiles and films requires polymers having a molecular weight of at least 23,000.

In another known process for increasing the molecular weight of polyamide, in particular polyhexamethyleneadipamide (U.S. Pat. No. 3,040,005), the polyamide in the form of a granulate, pellets or tablets, etc., is supplied to the feed funnel of a twin-screw extruder, 0.35–1.3 m$^3$/kg of inert gas being metered into the funnel to remove the atmospheric oxygen. On passing through the extruder the polymer melts and is processed with the cocurrently flowing inert gas which draws off the low molecular weight reaction products which are formed in the course of the polycondensation. The temperature of the polymer changes on passing through the extruder. Starting from room temperature it is raised to 296° C. The total residence time is 4–8 min. The degassing of the polyamide melt is effected in vacuo. To speed up the polycondensation, the nylon-6,6 has added to it a phosphorus-containing compound, for example, sodium hypophosphite, in an amount of 0.05–1.0% by weight, based on the polymer. The average molecular weight of the polyamide ($M_n$) rises from 17,000 to 39,000.

While this known process makes it possible to increase the molecular weight, it has the following disadvantages:

1. Oxidation of the polyamide in the vacuum treatment of the melt due to ingress of atmospheric oxygen into the extruder, since it is not possible to seal off the extruder completely.
2. High consumption of inert gas (0.35–1.3 m$^3$/kg) for obtaining the required molecular weight.
3. Wide molecular weight distribution.
4. Formation of gel particles. The last two disadvantages are due to excessive dewatering of the polyamide melt, caused by employing reduced pressure and/or blowing inert gas through the degassing zone of the polymer. As a result, overlong polymer chains form, and reactions between the chains (so-called superamidation) cannot take place.
5. Low output of the system and high specific energy consumption. For instance, the productivity in the case of using a twin-shaft extruder having a diameter of 3¼" (82.5 mm) was 1–2 kg/h for a specific energy consumption of 0.4–0.6 kWh/kg of polyamide.

SUMMARY OF THE INVENTION

It is therefore an object of the present invention to provide an improved process for preparing highly viscous polyamides, in particular polyhexamethyleneadipamide.

Another object of the present invention is to prepare polyamide having very homogeneous macromolecules without gel particle content.

It is also an object of the invention to increase the output of the system and to reduce the energy consumption.

In accomplishing the foregoing objects, there has been provided according to the present invention a process for preparing highly viscous polyhexamethyleneadipamide, comprising the steps of: introducing a melt of a polyhexamethyleneadipamide polymer having a relative viscosity of from about 2.5–2.7 (measured in a 1% strength solution in 96% strength sulfuric acid) into an extruder having a plurality of degassing zones; polycondensing the polymer melt in the extruder by treatment in a plurality of serially arranged zones of alternatingly elevated and reduced pressure; supplying in the zones of elevated pressure steam which is superheated to the temperature of the melt in an amount of from about 0.05–0.7 kg/kg of polymer to the melt; drawing off in the zones of reduced pressure any input vapor phase and water of condensation; and raising the temperature of the melt at a uniform rate over the length of the extruder from about 260°–280° C. in the first zone to about 280°–310° C. in the last zone. Preferably, the treatment of the melt is carried out in at least two of said zones each of elevated and of reduced pressure, more preferably three each of said zones. In a preferred embodiment, the process further comprises the step of uniformly reducing the pressure in the zones of reduced pressure from about 500–30 mbar in the first zone to about 50–30 mbar in the last zone. According to another embodiment, the polyamide melt is polycondensed in the presence of a phosphorus-containing compound.

Further objects, features and advantages of the present invention will become apparent from the detailed description of preferred embodiments which follows.

BRIEF DESCRIPTION OF THE DRAWING

In the drawings:

The FIG. of drawing is a schematic cross-sectional view of an apparatus for carrying out the process of the invention.

DETAILED DESCRIPTION OF THE PREFERRED EMBODIMENTS

The present invention comprises polycondensing a polyhexamethyleneadipamide melt having a relative viscosity $\eta$ rel of from about 2.5–2.7 by treatment in successive zones of an extruder which are alternatingly of elevated or reduced pressure. In the zones of elevated pressure, steam superheated to the temperature of the melt is supplied in an amount of from about 0.05–0.7 kg/kg of polymer to the melt, whereas in the zones of reduced pressure the input vapor phase and water of condensation are drawn off. The temperature of the melt is raised at a uniform rate over the length of the extruder from about 260°–280° C. in the first zone to about 280°–310° C. in the last zone.

In a preferred embodiment, the treatment of the polyamide melt can be effected, for example, in 3 zones of elevated pressure and 3 zones of reduced pressure. The amount of superheated steam which is supplied to every zone of elevated pressure can be, for example, from about 50–100% of the amount of steam which was passed into the preceding zone. The pressure in the zones of reduced pressure is reduced over the length of the extruder from about 500–30 mbar in the first zone to about 50–30 mbar in the last zone.

The process according to the invention is carried out as follows. The polymer melt having a relative viscosity $\eta$ rel of about 2.5–2.7 is fed through the feed opening into a twin-screw extruder. The melt flows into the first zone of elevated pressure, into which the steam superheated to the temperature of the melt is fed under pressure.

The elevated pressure in this zone prevents the spreading of the vacuum from the zone of reduced pressure into the feed zone and hence makes it impossible for atmospheric oxygen to enter through leaky screw seals of the extruder or through other leaky places.

In addition, the supply of superheated steam leads to foaming and hence to an increase in the specific polymer surface. Thereafter the polymer melt passes into the first zone under reduced pressure, where through the action of the vacuum, the previously supplied superheated steam and the resulting water of condensation are removed, and the conditions for the further polycondensation of nylon-6,6 for the purpose of increasing its molecular weight are created.

Thereafter the melt passes into the next zone under elevated pressure, where superheated steam is likewise added. Thanks to the presence of water in the form of steam, removal of water of condensation from the polymer melt in this zone and thus also the increase in the molecular weight of the polymer is slowed down. The reactions between the individual macromolecules which cause the molecular weight distribution to develop from a wide distribution (in the case of rapid polycondesation) toward a normal distribution, however, continue to take place.

The nylon-6,6 melt, during its passage through the extruder, is repeatedly treated in successive zones of elevated and reduced pressure, the number of which is chosen depending on the desired molecular weight, but not fewer than two zones of elevated pressure and two zones of reduced pressure. In the course of such treatment of the polyamide melt, i.e., when the molecular weight grows in stages with leveling out of the molecular weight distribution as a consequence of superamidation and under conditions which do not permit excessive dewatering of the polymer melt, the polymer obtained has very homogeneous macromolecules without inclusion of gel particles. The temperature of the melt is raised uniformly along the extruder from about 260°–280° C. in the first zone to about 280°–310° C. in the last zone. The increase in the temperature of the malt makes it possible to obtain high rates of reaction although the number of reactive end groups of the polyamide decreases considerably as the reaction proceeds and the molecular weight of the polymer increases.

On the other hand, the increase in temperature reduces the effective viscosity of the polymer melt itself. This facilitates the removal of water from the polymer and thus reduces the effect of diffusion processes on the course of the chemical reaction. The increase in the polycondensation temperature makes it possible to intensify the process significantly, the residence time of the polyamide melt in the extruder being from about 1.0–4.0 min., and the specific energy consumption being from about 0.1–0.3 kWh/kg of polymer. The short residence time of the polyamide in the extruder, in combination with the low moistening of the melt with superheated steam, prevents thermal decomposition of the polymer and also the formation of gel particles. The amount of superheated steam which, starting with the second zone, is fed into every zone of elevated pressure is from about 50–100% of the amount of steam fed into the preceding zone. The amount of superheated steam supplied into the zones of elevated pressure makes it possible to maintain an equilibrium in the molecular weight of the polyamide in every one of the successive zones at a higher level, which corresponds to the amount of superheated steam supplied to this zone.

The pressure in the zones of reduced pressure is reduced in the extruder from about 500–30 mbar in the first zone to about 50–30 mbar in the last zone. Thanks to this measure, the water vapor partial pressure over the surface of the melt in these zones is ever decreasing, as a result of which an adequately rapid removal of water of condensation combined with a continuous increase in the viscosity of the melt is guaranteed, which likewise contributes to an intensification of the process.

For the purpose of additionally speeding up the process it is possible to use a phosphorus-containing compound, for example, orthophosphoric acid, sodium hypophosphite, phenylphosphinic acid and the like, in an amount of from about 0.03–1.0% by weight, based on the amount of polyamide.

The new features of the process according to the invention are:

1. Treatment of a nylon-6,6 melt in serially connected zones of alternatingly elevated and reduced pressure for the purpose of increasing the viscosity. In a known process (West German Pat. No. 1,720,349), the nylon-6,6 melt is subjected to a degassing at a pressure of 50 torr to 2300 torr in at least one zone under reduced pressure to give in that case an increase in viscosity to 2.7–2.8 (relative viscosity in 1% strength solution in $H_2SO_4$).

In the process described in U.S. Pat. No. 3,040,005, the treatment of a low viscosity polyamide is carried out in a zone of reduced pressure, but according to the indications given there a product of changed color is obtained.

The use of alternating zones of elevated and reduced pressure guarantees the preparation of highly viscous nylon-6,6 (relative viscosity $\geq 4$) of homogeneous structure without change in color.

2. Adding superheated steam to the nylon-6,6 melt in a plurality of zones along the length of the extruder, for the purpose of enlarging the surface area of the melt and facilitating the removal of water of condensation in the zones of reduced pressure and creating the necessary conditions for the superamidation process to proceed in the zones of elevated pressure.

In the process described in West German Pat. No. 1,720,349, low viscosity nylon-6,6 is subjected to a continuous postpolycondensation in the presence of 1–10% of steam which is fed in together with the polymer and is practically completely removed as early as the first degassing zone of the extruder. The presence of steam in the known process is not directed toward an intensification of postpolycondensation, but is the consequence of using a prepolymer which has not been completely freed of water in the course of synthesis.

In the process according to the invention, the use of steam which is added to the nylon-6,6 melt in two or more zones makes it possible to intensify the postpolycondensation process and to prepare a highly viscous nylon-6,6 of high quality. This result is totally new.

Nor has there been described before the continuous postpolycondensation of nylon-6,6 in an extruder with uniform temperature increase on passing through the extruder and reduction of pressure in the zones. In the known processes described in West German Pat. No. 1,720,349 and U.S. Pat. No. 3,509,107 and No. 3,050,005, the postpolycondensation is carried out at temperatures of 275°–295° C., but the temperature is not changed over the length of the extruder. With these processes, it is true that the pressure in the degassing zones is within certain limits (for example 20–100 torr in U.S. Pat. No. 3,040,005; 50–2300 torr in West German Pat. No. 1,720,349), but the pressure is not changed over the length of the extruder.

The invention's uniform changing of these parameters over the length of the extruder guarantees optimal conditions for effecting the postpolycondensation and the subsequent superamidation along the entire length of the extruder with a simultaneous increase in viscosity of the polymer.

The invention is illustrated by means of the following Examples.

EXAMPLE 1

Nylon-6,6 melt having a relative viscosity $\eta$ rel of 2.5, measured in a 1% strength solution in 96% sulfuric acid, corresponding to a molecular weight of 17,000, is continuously fed at a rate of 8 kg/h into a twin-screw extruder (for example type ZSK 30) which has closely meshing screws turning in the same direction, a diameter of 30 mm and a ratio of length to diameter (1/d) of 42, and which is equipped with three zones of elevated pressure and three zones of reduced pressure. A screw speed of 100 r.p.m. is used.

The temperature of the polyamide melt is maintained in the zones at 270° C., 285° C. and 300° C., respectively. The amount of superheated steam supplied to the zones of elevated pressure is in each case 0.2 kg/h. The pressure in the zones of reduced pressure is set to 40 mbar.

The energy consumption is 0.18 kWh/kg of polymer.

After the treatment in the extruder, the nylon-6,6 has at the outlet a relative viscosity $\eta$ rel of 5.4, corresponding to $M_n = 34,000$, $Mw = 2.1\ M_n$ Note:

The molecular weight distribution characterizes the degree of polydispersion of the polyamide, where $M_w$ denotes the weight average of the molecular weight and $M_n$ the number average of the molecular weight and in the case of $Mw \leq 2.2$ a polymer having a high homogeneity $M_n$ of its $M_n$ macromolecules is present.

The terms "elevated" and "reduced" pressure refer to atmospheric pressure as the reference point.

The reaction conditions and results of further examples are listed in Table 1. These examples are carried out in the same type of apparatus and in generally the same way as Example 1.

TABLE 1

| Example No. | Productivity kg/h | Screw speed r.p.m. | Residence time of polymer in min. | Amount of superheated steam fed into the zones of reduced pressure kg/h | | | Pressure in the zones of reduced pressure mbar | | |
|---|---|---|---|---|---|---|---|---|---|
| | | | | I | II | III | I | II | III |

TABLE 1-continued

| | | | | | | | | | | |
|---|---|---|---|---|---|---|---|---|---|---|
| 2* | 4.0 | 70 | 3.0 | 0.057 | 0.029 | 0.014 | 500 | 275 | 50 |
| 3 | 4.0 | 70 | 3.0 | 0.114 | 0.057 | 0.029 | 500 | 275 | 50 |
| 4 | 4.0 | 70 | 3.0 | 1.6 | 0.8 | 0.4 | 500 | 275 | 50 |
| 5 | 4.0 | 70 | 3.0 | 2.28 | 1.14 | 0.58 | 500 | 275 | 50 |
| 6 | 4.0 | 70 | 3.0 | 0.23 | 0.11 | 0.06 | 300 | 165 | 30 |
| 7* | 4.0 | 70 | 3.0 | 0.23 | 0.11 | 0.06 | 200 | 100 | 10 |
| 8 | 4.0 | 70 | 3.0 | 0.23 | 0.11 | 0.06 | 500 | 330 | 50 |
| 9 | 4.0 | 70 | 3.0 | 0.23 | 0.11 | 0.06 | 300 | 165 | 30 |
| 10 | 4.0 | 70 | 3.0 | 0.23 | 0.11 | 0.06 | 300 | 165 | 30 |
| 11 | 4.0 | 70 | 3.0 | 0.23 | 0.11 | 0.06 | 300 | 165 | 30 |
| 12 | 8.0 | 100 | 1.5 | 0.23 | 0.11 | 0.06 | 300 | 165 | 30 |
| 13 | 4.0 | 70 | 3.0 | 0.47 | 0.23 | — | 400 | 40 | — |
| 14 | 4.0 | 70 | 3.0 | 0.23 | 0.11 | 0.06 | 30 | 30 | 30 |

| Example No. | Mass temperature of polyamide melt in zones, °C. | | | Relative viscosity of nylon-6.6 $\eta$ rel. | | Specific energy consumption kWh/kg of polymer | Degree of polydispersion of the polyamide Mw/Mn | Content of gel particles | Appearance of granules |
|---|---|---|---|---|---|---|---|---|---|
| | I | II | III | at extruder inlet | at extruder outlet | | | | |
| 2 | 260 | 275 | 290 | 2.7 | 4.3 | 0.13 | 3.2 | present | Polymer oxidized |
| 3 | 260 | 275 | 290 | 2.7 | 3.9 | 0.09 | 2.2 | absent | |
| 4 | 260 | 275 | 290 | 2.7 | 3.6 | 0.085 | 2.2 | absent | |
| 5 | 260 | 275 | 290 | 2.7 | 3.4 | 0.08 | 2.2 | absent | Discharge of polymer with the steam in the 1st zone |
| 6 | 260 | 275 | 290 | 2.7 | 4.5 | 0.14 | 2.2 | absent | |
| 7 | 260 | 275 | 290 | 2.7 | 5.3 | 0.18 | 2.8 | present in a small amount | |
| 8 | 260 | 275 | 290 | 2.7 | 3.6 | 0.085 | 2.2 | absent | |
| 9 | 280 | 295 | 310 | 2.7 | 6.9 | 0.28 | 2.2 | absent | |
| 10 | 290 | 305 | 320 | 2.7 | 7.5 | 0.3 | 2.3 | present | Polymer somewhat oxidized |
| 11 | 260 | 260 | 260 | 2.7 | 3.2 | 0.07 | 2.2 | absent | |
| 12 | 280 | 295 | 310 | 2.7 | 5.7 | 0.19 | 2.9 | absent | |
| 13 | 270 | 300 | — | 2.7 | 4.5 | 0.14 | 2.5 | absent | |
| 14 | 260 | 275 | 290 | 2.7 | 4.7 | 0.15 | 2.3 | absent | |

*Comparative examples

EXAMPLE 15

The process is carried out analogously to Example 1 using orthophosphoric acid as an accelerant in an amount of 0.05% by weight, based on the amount of polyamide.

At the outlet, the nylon-6,6 has a relative viscosity $\eta$ rel of 6.8 and the degree of polydispersion Mw is 2.3. Gel particles are absent. The energy consumption $M_n$ is 0.28 kWh/kg of polymer.

Increase in the number of zones having alternatingly elevated and reduced pressure to more than three in carrying out the postpolycondensation of nylon 6,6 ensures an increased productivity while maintaining the same residence time of the polymer in the extruder. As in this case it is necessary to increase the extruder length to an l/d of more than 42, which, however, is difficult to put into effect.

A comparison of the process according to the invention with the known processes is given in Table 2.

As can be seen in this table, the process according to the invention ensures the production of nylon-6,6 having a relative viscosity of up to 7.5, which is suitable for producing, for example, pipes, profiles and films on extruders. The polymer thus prepared is to be distinguished by a high homogeneity of the macromolecules and by the absence of gel particles. As a result, stability of the properties, processability and a high quality of the articles produced therefrom are ensured. The polymer obtained is moreover colorless. The process according to the invention for preparing highly viscous nylon-6,6 is highly productive, the requisite viscosity being obtained in a postpolycondesation time which is 2.5 times less than that in the nearest prior art (U.S. Pat. No. 3,040,005).

TABLE 2

Comparison of process according to the invention with the known processes.

| | Characteristic | Process according to the invention | Known process as described in | | |
|---|---|---|---|---|---|
| | | | U.S. Pat. No. 3,040,005 | West German Patent 1,720,349 | U.S. Pat. No. 2,509,107 |
| 1 | Molecular weight of the polymer | up to 45,000 | 39,000 | — | — |
| 2 | Relative viscosity of the polymer in 1% strength solution in 96% $H_2SO_4$ | up to 7.5 | 6.5 | 2.7 | 3 |
| 3 | Gel particles content | absent | present | absent | absent |
| 4 | Homogeneity of the polymer | homogeneous | not homogeneous | homogeneous | homogeneous |
| 5 | Residence time in postpolycondensation apparatus, min. | 1–4 | 4–8 | 5–45 | 6–90 |
| 6 | Specific energy consumption of melt, kWh/kg | 0.1–0.3 | 0.4–0.6 | 0.03–0.2 | — |

TABLE 2-continued

Comparison of process according to the invention with the known processes.

| Characteristic | Process according to the invention | Known process as described in U.S. Pat. No. 3,040,005 | Known process as described in West German Patent 1,720,349 | Known process as described in U.S. Pat. No. 2,509,107 |
| --- | --- | --- | --- | --- |
| 7 Specific inert gas consumption kg/kg | 0.1–0.5 (steam) | 5.5 (nitrogen) | 0.01–0.1 (steam) | 0.03 (nitrogen) |

What is claimed is:

1. A process for preparing highly viscous polyhexamethyleneadipamide, comprising the steps of:
    introducing a melt of a polyhexamethyleneadipamide polymer having a relative viscosity of from about 2.5–2.7, measured in a 1% strength solution in 96% strength sulfuric acid, into an extruder having a plurality of degassing zones;
    polycondensing the polymer in the extruder by treatment in a plurality of serially arranged zones of alternatingiy elevated and reduced pressure, said elevated pressure zones having a pressure above atmospheric pressure and said reduced pressure zones having a pressure below atmospheric pressure;
    supplying in the zones of elevated pressure steam which is superheated to the temperature of the melt in an amount of from about 0.05–0.7 kg/kg of polymer to the melt;
    drawing off in the zones of reduced pressure any input vapor phase and water of condensation; and
    raising the temperature of the melt at a uniform rate over the length of the extruder from about 260°–280° C. in the first zone to about 280°–310° C. in the last zone whereby a film-forming polymer having a relative viscosity greater than the relative viscosity of the polymer introduced into the extruder is produced.

2. A process as claimed in claim 1, wherein the treatment of the melt is carried out in at least two of said zones each of elevated and of reduced pressure.

3. A process as claimed in claim 1, wherein the amount of superheated steam which is supplied to every second zone of elevated pressure is from 50–100% of the amount of steam fed into the preceding zone.

4. A process as claimed in claim 1, further comprising the step of uniformly reducing the pressure in the zones of reduced pressure from about 500–30 mbar in the first zone to about 50–30 mbar in the last zone.

5. A process as claimed in claim 1, wherein the polyamide melt is polycondensed in the presence of a phosphorus-containing compound in an amount of from about 0.03–1% by weight, based on the polyamide.

6. A process as claimed in claim 5, wherein said phosphorus-containing compound is selected from the group consisting of orthophosphoric acid, sodium hypophosphite and phenylphosphinic acid.

7. A process as claimed in claim 4, wherein the temperature reduction profile and the pressure reduction profile are selected relative to one another so as to produce a polyamide having a predetermined degree of polydispersion.

8. A process as claimed in claim 1, wherein the treatment of the melt is carried out in three of said zones each of elevated and reduced pressure.

9. A process as claimed in claim 1, wherein the process is carried out in a twin-screw extruder having closely meshing screws which turn in the same direction.

10. A process according to claim 1 wherein the pressure in each reduced pressure zone is less than the pressure in the previous reduced pressure zone.

11. A process for preparing highly vicous polyhexamethyleneadipamide, comprisinq the steps of:
    introducing a melt of a polyhexamethyleneadipamide polymer having a relative viscosity of from about 2.5–2.7, measured in a 1% strength solution in 96% strength sulfuric acid, into an extruder having a plurality of degassing zones;
    polycondensing the polymer in the extruder by treatment in a plurality of serially arranged zones of alternatingly elevated and reduced pressure, said elevated pressure zones having a pressure above atmospheric pressure and said reduced pressure zones having a pressure below atmospheric pressure;
    supplying in the zones of elevated pressure steam which is superheated to the temperature of the melt in an amount of from about 0.05–0.7 kg/kg of polymer to the melt;
    drawing off in the zones of reduced pressure any input vapor phase and water of condensation; and
    raising the temperature of the melt at a uniform rate over the length of the extruder from about 260°–280° C. in the first zone to about 280°–310° C. in the last zone whereby a polymer having a relative viscosity of from about 3.7 to 7.5 is produced.

* * * * *